United States Patent [19]

Foley

[11] 4,167,002
[45] Sep. 4, 1979

[54] LOW FUEL INDICATING DEVICE
[75] Inventor: Newman C. Foley, Superior, Wis.
[73] Assignee: N. B. F. Company, Inc., Superior, Wis.
[21] Appl. No.: 885,371
[22] Filed: Mar. 10, 1978
[51] Int. Cl.$^2$ ............................................. G08B 21/00
[52] U.S. Cl. .................................. 340/59; 340/27 R; 340/612
[58] Field of Search .................. 340/59, 60, 603, 606, 340/611, 612, 614, 623, 624, 27 R

[56] References Cited
U.S. PATENT DOCUMENTS

| 4,035,789 | 7/1977 | Akita et al. | 340/59 |
| 4,037,193 | 7/1977 | Vemura | 340/59 |
| 4,066,997 | 1/1978 | Ohmi et al. | 340/59 |

Primary Examiner—Alvin H. Waring
Attorney, Agent, or Firm—Jacobi, Lilling & Siegel

[57] ABSTRACT

A device for detecting and indicating pending exhaustion of the fuel supply for an airplane or the like. The device preferably is connected between the fuel supply and the fuel pump of the airplane, and comprises a fuel reservoir bowl, a fuel inlet, a fuel outlet, a float switch above the bowl and a vapor orifice for directing fuel vapors from the upper portion of the reservoir bowl to the outlet. Some fuel passing through the device accumulates in the reservoir bowl and entrained fuel vapors move upwardly and pass through the vapor orifice to the outlet. When the fuel supply is low and more vapor is entrained therein, vapor is trapped in the upper portion of the device and forces the fuel level in the reservoir downwardly which causes the float switch to close a circuit to a low fuel alarm and/or indicator. The fuel in the reservoir bowl can be used for continued engine operation to allow sufficient time for corrective action after low fuel has been indicated.

10 Claims, 5 Drawing Figures

LOW FUEL INDICATING DEVICE

BACKGROUND OF THE INVENTION

The present invention relates to a low fuel indicating device for an airplane or the like and, more particularly, to such a device which will provide a temporary supply of fuel after low fuel is indicated to allow sufficient time for corrective action.

The need for such a device is demonstrated in the Federal Aviation Administration (FAA) reports on aviation accidents. There are a number of accidents which occur because of fuel exhaustion, and yet FAA accident investigations find ample fuel remaining aboard the aircraft. The pilot either forgot to switch to the fullest tank or switched to an empty tank. Many of these fuel starvation accidents occur at low altitudes, e.g., during landing and takeoff flight configurations where there is not sufficient time to restart an engine. It usually takes time to restart an engine and, without power at low altitude, the aircraft is apt to make contact with the ground before engine power can be restored.

Loss of power because of fuel exhaustion at reasonably high altitudes is not apt to result in an accident. Even though altitude is lost, time is afforded in which to switch to an alternate fuel source or respond by implementing emergency procedures. However, some engines, owing to various reasons, are difficult or nearly impossible to restart while in flight, and an emergency landing is the only recourse which can be executed successfully if conditions permit proper execution of these procedures.

In a typical aircraft fuel system, a pilot has manual duties to perform to manage fuel consumption and ensure proper engine operation. By the use of a fuel selector valve for multiple fuel tanks and an electric fuel pump, for example, the pilot can maintain a fuel flow to the engine to ensure power. The objective of operating these devices is to manage fuel so that at the end of the flight one tank contains the majority of the fuel remaining on board. Landing, while operating from the fullest tank, ensures an adequate fuel supply to an engine. Landing maneuvers may uncover the outlet of a partially filled tank and allow the fuel system to take in vapor which can cause a temporary or complete power failure.

In many aircraft fuel systems the electric fuel pump is a back-up to the normal engine fuel pump in case it fails. The electric fuel pump is used to insure fuel flow during takeoffs and landings, and is also turned on during normal flight conditions prior to operating the fuel selector valve to insure that there is no momentary interruption in fuel flow.

Fuel quantity gauges are used to show how much fuel remains aboard the aircraft. In most cases, these gauges are similar to the types used in automobiles and other vehicles. At best they are an indication with questionable accuracy, especially when the needle approaches the empty mark, the problem being that the fuel tank may run dry prior to the gauge indicating empty. Such gauges may indicate properly or may indicate empty with a large quantity of fuel remaining in the tank. These inaccuracies are not serious in automobile operation; however, they present a serious problem in aircraft operation, especially near the end of a flight when fuel quantities can be low.

Aircraft flight is not always a smooth ride. As much as a passenger may be bounced about during a rough ride, so is the fuel because neither is rigidly secured to the air-frame. It can be envisioned, under these circumstances, that certain amounts of fuel and vapors in the fuel tanks become mixed (vapor entrainment). A full tank will be subject to less vapor entrainment than a partly empty tank because of the availability of vapor volumes. Therefore, it is common for entrained vapors to be ingested by the engine and, by one means or another, engines are designed to compensate for this phenomenon. It will be understood that space above liquid surface in a fuel tank is referred to herein as vapor, a mixture of atmospheric air and fuel fumes—a combustible mixture of these two gases. Certain amounts of these vapors are either burned in the engine or vented. However, a large amount of vapor, substituted as fuel, will cause the engine to lose power to stop operating.

Although the basic aircraft fuel system has been dealt with as a single engine arrangement, the same explanations and problems apply to multi-engine aircraft. Each engine of an aircraft may have a fuel system similar to that described herein, the exception being that some high-wing aircraft, with fuel tanks in the wings, may eliminate the electric fuel pump because of the availability of gravity feed. In the latter case, however, the flight operations are faced with the possible fuel starvation problems previously explained.

SUMMARY OF THE INVENTION

It will be readily seen, therefore, that a need has arisen for a device that will reliably detect and indicate low fuel in a fuel supply system for an aircraft or the like. The device of the present invention fulfills this need and further provides a temporary fuel supply after low fuel is indicated to ensure sufficient time for corrective action.

The subject device is arranged and designed so as not to adversely affect the normal fuel flow. The normal amounts of entrained vapors are allowed to pass through the device, impeded for a brief period of time. However, the device will trap large quantities of vapor present in a low fuel supply and cause an alarm to announce the occurrence. After low fuel has been indicated, the device provides a small quantity of fuel for continued engine operation, an amount sufficient to provide time for corrective action. The corrective action may be to switch to another tank or plan for an emergency landing if all fuel has been exhausted. In either case, a reaction time is provided so that these remedial steps can be better managed and a serious accident avoided.

The device preferably is connected between the fuel supply and the fuel pump of the airplane, and comprises a fuel reservoir bowl, a fuel inlet, a fuel outlet, a float switch above the bowl and a vapor orifice for directing fuel vapors from the upper portion of the reservoir bowl to the outlet. Some fuel passing through the device accumulates in the reservoir bowl and entrained fuel vapors move upwardly and pass through the vapor orifice to the outlet. When the fuel supply is low and more vapor is entrained therein, vapor is trapped in the upper portion of the device and forces the fuel level in the reservoir downwardly which causes the float switch to close a circuit to a low fuel alarm and/or indicator. The fuel in the reservoir bowl can be used for continued engine operation to allow sufficient time for corrective action after low fuel has been indicated.

DESCRIPTION OF THE PREFERRED EMBODIMENTS

Figure 1:
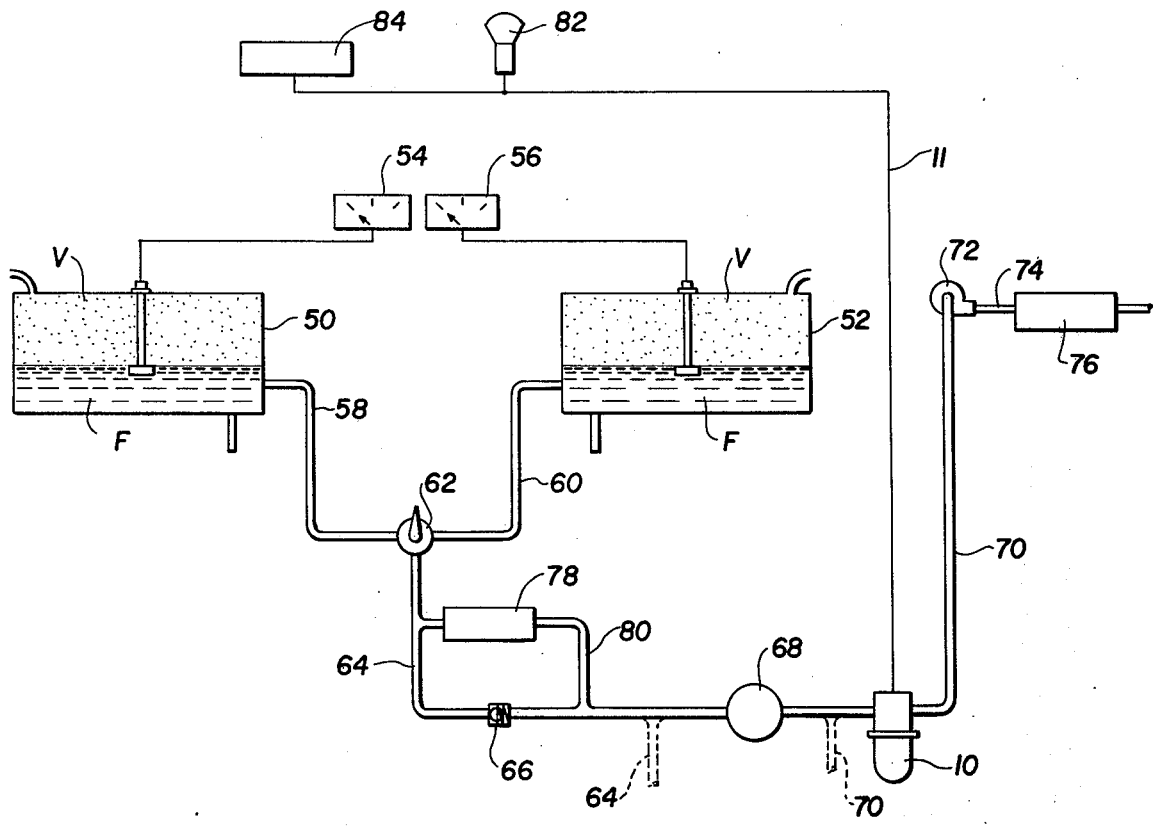
FIG. 1 is a schematic view of a typical fuel system for an airplane or the like, with the indicating device of the present invention connected to the system.

FIG. 1 illustrates a typical fuel system for an aircraft engine or the like, comprising a pair of fuel tanks 50, 52 and fuel indicating gauges 54, 56 operatively connected to the tanks. Each of the tanks 50, 52 contains fuel F and vapor V in the area above the fuel in the tank. The tanks 50, 52 are connected by fuel lines 58, 60 to a fuel tank selector valve 62 of any suitable construction which, in turn, is connected by a fuel line 64 to a check valve 66 and a fuel filter 68, both of any suitable construction. The fuel filter is connected by a fuel line 70 to an engine fuel pump 72 of any suitable construction which, in turn, is connected by a fuel line 74 to a carburetor or fuel injector 76 connected to the engine (not shown). An auxiliary electric fuel pump 78 may be connected to the fuel line 64 by an auxiliary fuel line 80 for the purpose of insuring adequate fuel flow during take-off and landing and when switching from one fuel tank to another through manipulation of the selector valve 62.

Figure 2:
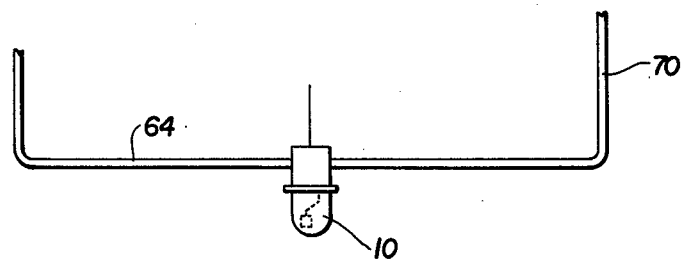
FIG. 2 shows a portion of the schematic view of FIG. 1, with an alternate connection of the indicating device.

As shown in FIG. 1, the indicating device 10 of the present invention may be connected to the fuel line 70 between the filter 68 and the fuel pump 72. An alternate arrangement is shown in FIG. 2 and partially in broken lines in FIG. 1, where the indicating device 10 is connected directly to the check valve 66 by the fuel line 64 and the fuel filter 68 is eliminated. In this alternate arrangement, the indicating device 10 is provided with a fuel filter in a manner more fully described hereinafter.

The indicating device 10 is connected by suitable connectors 11 to a suitable power source (not shown), such as a battery, and to an audible alarm 82 and/or visible indicating means 84 of any suitable construction and operation.

Figure 3:
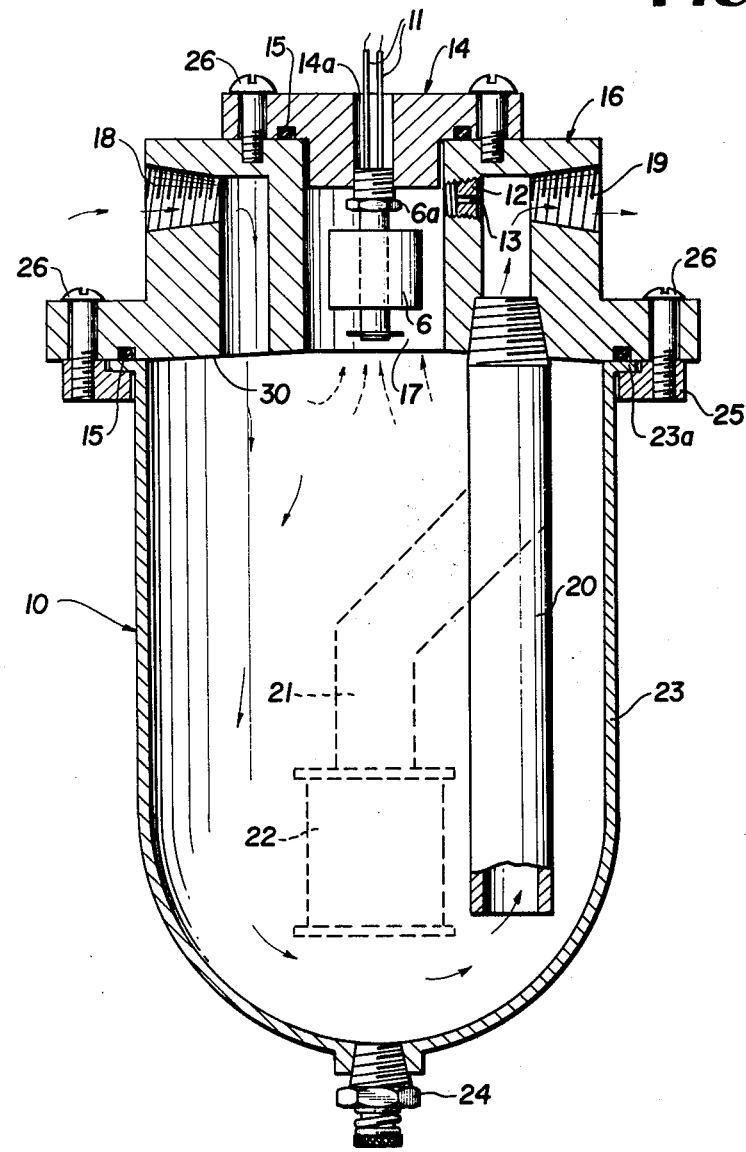
FIG. 3 is an elevational view partially in section of the indicating device of the present invention.

Referring to FIG. 3, the indicating device 10 of the present invention generally comprises a cap 14, an operating head 16 and a reservoir bowl 23. The cap 14 and head 16 are sealingly secured together by any suitable means, such as bolts 26 and gaskets 15, and the head 16 and bowl 23 are sealingly secured together by any suitable means, such as bolts 26, gaskets 15 and a retaining ring 25 engaged by the bolts 26.

The operating head 16 comprises an inlet port 18 and, an outlet port 19 on opposite sides thereof, which preferably are provided with aviation-type tapered piping threads so that the device can be conveniently installed into an aircraft fuel piping system and retain pressure. A float switch assembly 6 is secured by a pressure retaining connection 6a to the underside of the cap 14 so that the connectors 11 extend from the switch assembly 6 outwardly of the cap 14 through a bore 14a therein. The cap 14 and head 16 define a vapor chamber 17 in which the float switch assembly 6 is disposed, the vapor chamber 17 being in communication at its lower end with the reservoir bowl 23. The operating head 16 preferably is provided with a concave lower surface 30 so as to direct vapors from the bowl 23 into the vapor chamber 17. The operating head 16 may be provided with a mounting portion (not shown) so that the indicating device 10 may be attached to a convenient structural member of the aircraft.

Adjacent to the outlet port 19, the operating head 16 has an orifice plug 12 secured thereto, the plug 12 having an orifice 13 sized to regulate the passage of vapors from the vapor chamber 17 into the outlet port 19. A suction or fuel outlet tube 20 in communication with the outlet port 19 is secured to the head 16, preferably by aviation tapered threads, and drops deeply into the reservoir bowl 23, so as to create a reservoir of fuel in the bowl 23 and permit vapors to separate from the fuel within the bowl and accumulate in the vapor chamber 17. Although a simple straight tube 20 is shown in FIG. 3, the indicating device 10 can alternately serve as a fuel filter through use of an alternate suction tube 21 having a filter 22 at its lower end, as shown in broken lines in FIG. 3.

The orifice plug 12 is threaded (preferably aviation tapered type) and slotted for screwdriver installation into a similar threaded hole in the operating head 16. The tapered threads in this arrangement are provided so that a seal is created. The only passage for vapors from the vapor chamber 17 into the outlet port 19, therefore, is through the orifice 13.

The reservoir bowl 23 preferably is cylindrical in shape, the upper end being open with a flange 23a for sealing against the operating head 16 by gasket 15. The other end is formed into a generally conical shape with an opening at the lower center portion thereof which preferably is provided with aviation tapered threads into which a "Quick Drain" 24 or the like is installed. The "Quick Drain" 24 may be a common valve-type device, spring-loaded to close automatically (manual force to open), or a valve which requires manual force to open and close it. This drain is necessary to evacuate water and sediments which might collect in the reservoir bowl 23.

Figure 4:
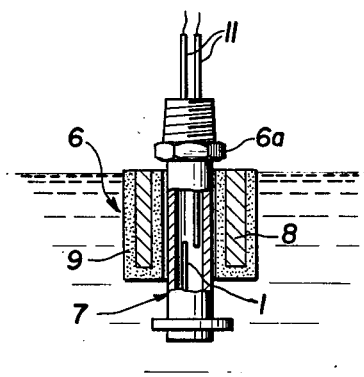
FIG. 4 is an enlarged elevational view partially in section of the float switch of the subject indicating device, showing the float switch in an open position.
Figure 5:
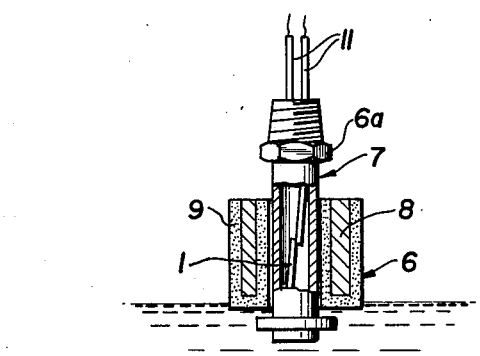
FIG. 5 is a view similar to FIG. 4, showing the float switch in a closed position.

The float switch assembly 6 may be of any suitable construction. As shown in FIGS. 4 and 5, the float switch assembly 6 preferably comprises a float 9 containing a permanent magnet 8 and, as the float travels along the float switch stem 7 with stops, the magnets 8 cause the contacts 1 in the stem 7 to open and close to make and break an electric circuit to the conductors 11. In this application, the switch is open when the float is at the high point of travel shown in FIG. 4, and closed when at the low point of travel shown in FIG. 5. When installed in a suitable electrical circuit (see FIG. 1) the float switch assembly 6 can be used to operate the visible indicating means 84 and/or the audible alarm 82. These alarm devices may be conveniently located in the cockpit of the aircraft.

In the operation of the indicating device 10, fuel enters the inlet port 18 and is directed downwardly into the reservoir bowl 23. The fluid velocity of the fuel, as it enters this reservoir, is greatly reduced, thereby allowing the entrained vapors to separate from the liquid fuel. The velocity reduction is directly proportional to the square of the diameters, e.g., if the inlet conduit has a one inch diameter and the reservoir bowl has a four inch diameter, the velocity reduction is in the ratio of 1 to 16, i.e., the liquid velocity in the reservoir would be 16 times slower than that in the inlet conduit. This reduction in liquid velocity allows the entrained vapors to migrate towards the top of the reservoir bowl 23.

Some of the vapors which migrate upwardly in the reservoir bowl enter the vapor chamber 17 directly, while others are directed into this chamber by the concave lower surface 30 of the head 16. As the normal entrained vapors collect in this space, they are allowed to escape through plug orifice 13, returning to the normal flow of fuel to the engine as the fuel exits through outlet port 19. Orifice 13 is of a size just large enough to allow the normal entrained vapor content in the fuel to pass through the indicating device 10.

The normal flow of liquid fuel through the device 10 is from the inlet port 18 downwardly into the reservoir bowl 23, where fluid velocity decreases to allow entrained vapors to separate from the fuel. The fuel migrates downwardly in the reservoir bowl 23 and enters the suction or outlet tube 20 (or filter 22 and suction tube 21, as an alternate). In suction tube 20, the conduit fluid velocity increases and, as this fluid passes through the outlet port 19, it again entrains the vapors escaping through the orifice 13. The engine ingests these vapors with the fuel as a normal occurrence.

Prior to a fuel tank becoming completely empty, abnormal amounts of vapor enter the fuel system. As this vapor enters the indicating device 10, the accumulation in vapor chamber 17 is such that the normal capacity of vapor orifice 13 is exceeded and the liquid fuel level in the vapor chamber 17 is pushed downwardly. As the vapor accumulation lowers the liquid fuel level, the float 9 follows the liquid level and, at a predetermined liquid level point, the magnets 8 in the float 9 of the switch assembly 6 cause the contacts 10 to move from the open position in FIG. 4 to the closed position in FIG. 5. At this point, a circuit is closed via the connectors 11 to the audible alarm 82 and/or the visible indicating means 84 shown in FIG. 1 to indicate a low fuel level in the tank.

After low fuel is indicated, a reservoir of fuel in the reservoir bowl 23 is available to ensure continued engine operation for a short period of time sufficient to allow corrective action before fuel exhaustion occurs.

Assuming that a new source of fuel is selected, the indicating device 10 of the present invention will reset itself after the excess vapor has passed out of the vapor chamber 17. The excess vapors which have accumulated in the vapor chamber 17 escape, in due course, through orifice 13 and are ingested by the engine. The engine may run rough for a period of time but, since the pilot has a mixture control (not shown), the fuel consumption can be increased to richen the fuel-to-air ratio feed into the engine. Such manual controls are common to aircraft operation.

The indicating device 10 of the present invention solves a significant fuel management problem associated with aircraft flight.

What is claimed is:

1. A device for detecting and indicating a low liquid fuel supply for an airplane engine or the like, said device comprising:

a head having an inlet adapted to be connected to the fuel supply, and an outlet adapted to be connected to a fuel line leading to the engine;

a reservoir secured to and disposed beneath said head, said reservoir being in communication with said inlet and said outlet so that fuel passes through said reservoir from said inlet to said outlet and accumulates therein;

said head having a vapor chamber disposed above and in communication with said reservoir, and orifice means disposed between said vapor chamber and said outlet to provide for a predetermined flow of vapor from said vapor chamber to said outlet; and float switch means movably disposed within said vapor chamber and adapted to be electrically connected to a low fuel indicator, said float switch means being movable between an upper position wherein it opens a circuit to the indicator and a lower position wherein it closes a circuit to the indicator;

whereby when the fuel supply is adequate, fuel entering said inlet and reservoir has a normal vapor content and liquid fuel accumulates in said reservoir and rises to a level to maintain said float switch means in said upper position, the vapor rising above the liquid fuel into said vapor chamber and passing through said orifice to said outlet; and when the fuel supply is low, the fuel entering the reservoir has a high vapor content which accumulates in said vapor chamber and forces the liquid fuel level downwardly so that said float switch means moves to its lower position to indicate low fuel; the liquid fuel in said reservoir providing a temporary fuel supply through said outlet after low fuel is indicated.

2. The device of claim 1 wherein an outlet conduit is connected at one end to said head in communication with said outlet, and the other end thereof is disposed near the lower portion of said reservoir.

3. The device of claim 2 wherein a fuel filter is connected to said other end of said outlet conduit.

4. The device of claim 1 wherein the lower surface of said head is inclined upwardly and inwardly toward said vapor chamber to direct fuel vapors thereto.

5. The device of claim 1 wherein said reservoir has a drain opening in the bottom portion thereof, and valve means is mounted in said drain opening for opening or closing it.

6. The device of claim 1 wherein a cap is secured to the upper portion of said head and defines the upper portion of said vapor chamber, said float switch means being secured to said cap, and said cap having an aperture therethrough for the passage of connectors from said float switch means to a low fuel indicator.

7. The device of claim 1 wherein said head is provided with a wall having an opening between said vapor chamber and said outlet, and said orifice is provided in a plug mounted in said wall opening.

8. The device of claim 1 wherein said reservoir is generally cylindrical in shape and has a generally conical lower portion.

9. The device of claim 1 wherein said inlet and said outlet are provided with aviation-type, tapered, threaded openings.

10. The device of claim 1 wherein said float switch means is electrically connected to an audible alarm and a visible indicating means.

* * * * *